United States Patent
Pan

(10) Patent No.: US 9,632,002 B2
(45) Date of Patent: Apr. 25, 2017

(54) LEAK TEST SYSTEM AND METHOD FOR TESTING SEMI-FINISHED PRODUCT OF SPEAKER

(71) Applicant: Primax Electronics Ltd., Neihu, Taipei (TW)

(72) Inventor: Yung-Tai Pan, Taipei (TW)

(73) Assignee: PRIMAX ELECTRONICS LTD., Taipei (TW)

( * ) Notice: Subject to any disclaimer, the term of this patent is extended or adjusted under 35 U.S.C. 154(b) by 307 days.

(21) Appl. No.: 14/478,739

(22) Filed: Sep. 5, 2014

(65) Prior Publication Data

US 2015/0369691 A1 Dec. 24, 2015

(30) Foreign Application Priority Data

Jun. 20, 2014 (TW) ............................. 103121407 A

(51) Int. Cl.
*G01M 3/32* (2006.01)
*G01M 3/34* (2006.01)

(52) U.S. Cl.
CPC ........ *G01M 3/3209* (2013.01); *G01M 3/3272* (2013.01); *G01M 3/34* (2013.01)

(58) Field of Classification Search
CPC .... G01M 3/3209; G01M 3/3272; G01M 3/34; H04R 29/001
USPC ............................................................ 73/40
See application file for complete search history.

(56) References Cited

U.S. PATENT DOCUMENTS

| | | | | | |
|---|---|---|---|---|---|
| 4,719,801 | A | * | 1/1988 | Blaser | G01L 3/24 73/40 |
| 4,773,502 | A | * | 9/1988 | Adair | H04R 1/02 181/144 |
| 5,461,906 | A | * | 10/1995 | Bogle | G01M 3/24 340/618 |
| 2005/0238178 | A1 | * | 10/2005 | Garcia | H04R 29/001 381/59 |
| 2013/0291624 | A1 | * | 11/2013 | Yaberg | G01M 3/34 73/40 |

* cited by examiner

*Primary Examiner* — Francis Gray
(74) *Attorney, Agent, or Firm* — Kirton McConkie; Evan R. Witt

(57) ABSTRACT

A leak test system and a leak test method are provided for testing whether a semi-finished product of a speaker has a leak. The semi-finished product of the speaker includes a case. An interface is installed on a surface of the case. The leak test system includes a covering element, a vacuum generator, and a pressure gauge. The covering element is attached on the surface of the case, so that the interface of the semi-finished product of the speaker is covered by the covering element. A negative pressure value of the covering element is generated by the vacuum generator. If the equilibrium pressure value is lower than a default negative pressure value, the leak test system judges that the semi-finished product of the speaker has the leak. Consequently, the testing efficiency is enhanced.

9 Claims, 4 Drawing Sheets

LEAK TEST SYSTEM AND METHOD FOR TESTING SEMI-FINISHED PRODUCT OF SPEAKER

FIELD OF THE INVENTION

The present invention relates to a leak test system and a leak test method for testing a speaker, and more particularly to a leak test system and a leak test method for testing a semi-finished product of a speaker.

BACKGROUND OF THE INVENTION

With the prevalence of various types of audio and video entertainments, it is important to play audio files of electronic devices (e.g. stereo devices, computers, television or mobile phones). Since speakers are able to convert electronic signals into sound waves, speakers become important peripheral electronic devices in modern lives.

According to the structures of the sound boxes (also referred as enclosures), speakers are usually classified into close-type speakers and open-type speakers. In the close-type speaker, a speaker unit is placed within an enclosure without opening, and the space within the enclosure is a close space. In the open-type speaker, a speaker unit is placed within an enclosure with an opening, and the space within the enclosure is an open space. The radiation sound wave generated by the speaker unit of the open-type speaker is outputted through the opening and the open space, and thus the low-frequency radiation intensity is enhanced.

Conventionally, the enclosure is assembled by wood boards. Recently, due to the high ductility and the dyeable property, plastic material is gradually used as the material of the enclosure. Consequently, the outer appearance design of the enclosure becomes diversified. However, due to the limitations of the plastic molding technologies, it is difficult to produce the integral structure of the enclosure. Generally, the plastic enclosure is assembled by two enclosure cases. Each of the enclosure cases has a concave part. After the concave parts of the two enclosure cases are aligned with each other, the two enclosure cases are combined together. Consequently, the inner space of the enclosure is defined by the concave parts of the two enclosure cases collaboratively. Since the single enclosure case cannot be assembled as the complete speaker, the enclosure case before assembled is usually considered as a semi-finished product of the speaker.

In case that the enclosure of the speaker has a leak, the sound wave may irregularly leak out through the leak. Under this circumstance, the sound quality of the speaker is deteriorated. For maintaining the quality of the speaker, it is necessary to test the speaker before the speaker leaves the factory. If the leak test is performed after the two enclosure cases are assembled as the completed speaker, some problems may occur. For example, if the result of the leak test indicates that the leak is not at the junction between the two enclosure cases but the leak is at one of the two enclosure cases (i.e. one of the two enclosure cases is qualified but the other enclosure case is unqualified), it is time-consuming to detach the two enclosure cases of the assembled speaker from each other and test which enclosure case is unqualified. Then, the qualified enclosure case may be recycled. Since the flowchart of testing the speaker is very complicated, the testing efficiency is usually unsatisfied.

For simplifying the flowchart of testing speakers, there is a need of providing a leak test system and a leak test method for testing a speaker in order to solve the above drawbacks.

SUMMARY OF THE INVENTION

An object of the present invention provides a leak test system and a leak test method for testing a semi-finished product of a speaker efficiently.

In accordance with an aspect of the present invention, there is provided a leak test system for testing a semi-finished product of a speaker by detecting whether the semi-finished product of the speaker has a leak. The semi-finished product of the speaker includes a case. An interface is installed on a surface of the case. The leak test system includes a covering element, a vacuum generator, and a pressure gauge. The covering element is attached on the surface of the case of the semi-finished product of the speaker, so that the interface of the semi-finished product of the speaker is covered by the covering element. The vacuum generator is in communication with the covering element. A negative pressure value of the covering element is generated by the vacuum generator. An equilibrium pressure value of the covering element is measured by the pressure gauge. According to a result of comparing the equilibrium pressure value of the covering element with a default negative pressure value, the leak test system judges whether the semi-finished product of the speaker has the leak. The default negative pressure value is the negative pressure value generated by the vacuum generator when a qualified semi-finished product of the speaker is tested.

In accordance with another aspect of the present invention, there is provided a leak test method for testing a semi-finished product of a speaker by detecting whether the semi-finished product of the speaker has a leak. The semi-finished product of the speaker includes a case. An interface is installed on a surface of the case. The leak test method includes the following steps. Firstly, a covering element is attached on the surface of the case of the semi-finished product of the speaker, so that the interface of the semi-finished product of the speaker is covered by the covering element. Then, a vacuum generator is enabled, so that a negative pressure value of the covering element is generated. Then, an equilibrium pressure value of the covering element is measured. Then, a judging step is performed to judge whether the semi-finished product of the speaker has the leak according to a result of comparing the equilibrium pressure value of the covering element with a default negative pressure value. The default negative pressure value is the negative pressure generated by the vacuum generator when a qualified semi-finished product of the speaker is tested.

The above objects and advantages of the present invention will become more readily apparent to those ordinarily skilled in the art after reviewing the following detailed description and accompanying drawings, in which:

DETAILED DESCRIPTION OF THE PREFERRED EMBODIMENT

The enclosure (or sound box) used in the speaker of the present invention includes but is not limited to a closed enclosure, a bass reflex enclosure, a labyrinth enclosure or a horn type enclosure. In the following embodiments, the speaker with the closed enclosure will be illustrated as an example.

Figure 1:
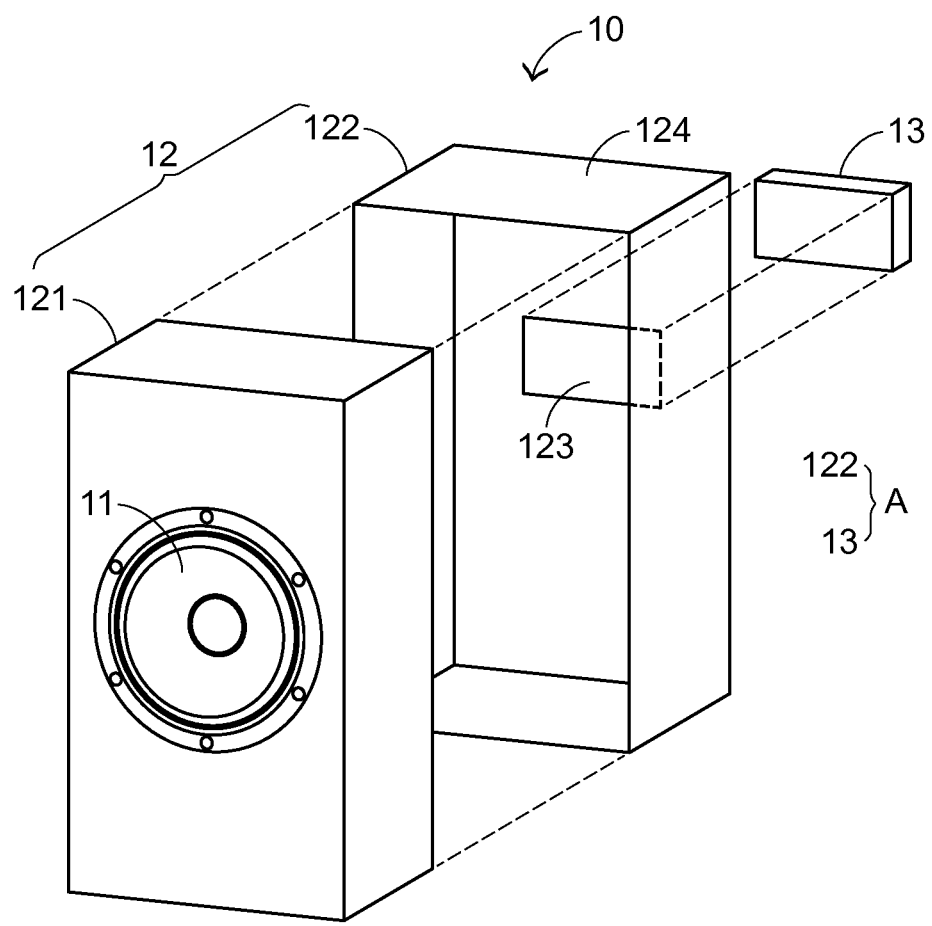
FIG. 1 is a schematic exploded view illustrating a speaker according to an embodiment of the present invention.
Figure 2:
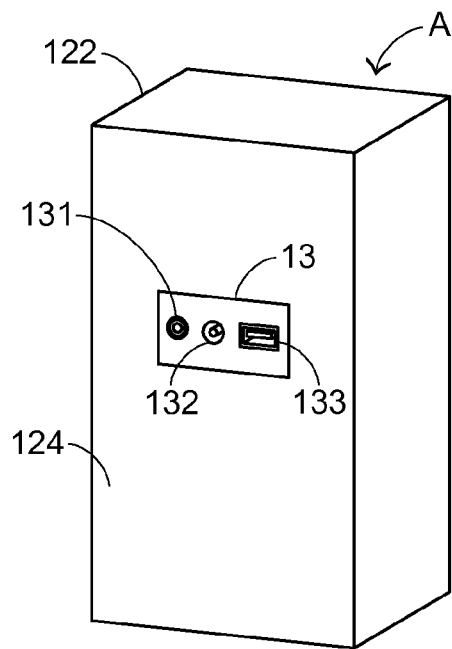
FIG. 2 is a schematic perspective view illustrating a semi-finished product of the speaker according to the embodiment of the present invention.

Please refer to FIGS. 1 and 2. FIG. 1 is a schematic exploded view illustrating a speaker according to an embodiment of the present invention. FIG. 2 is a schematic perspective view illustrating a semi-finished product of the speaker according to the embodiment of the present invention. As shown in FIGS. 1 and 2, the speaker 10 comprises a speaker unit 11, an enclosure 12, and an interface 13. The enclosure 12 comprises a first case 121 and a second case 122. The second case 122 has an opening 123. The opening 123 is formed in a surface 124 of the second case 122. The interface 13 is embedded in the opening 123.

The first case 121 and the second case 122 of the enclosure 12 comprises respective concave parts. After the concave part (not shown) of the first case 121 and the concave part of the second case 122 are aligned with each other, the first case 121 and the second case 122 may be combined together. Consequently, the inner space of the enclosure 12 is defined by the concave parts of the first case 121 and the second case 122 collaboratively. The interface 13 is installed on the surface 124 of the second case 122. The interface 13 is used as a connection interface for connecting a power source or other device. In this embodiment, the interface 13 comprises an audio input connection port 131, a power source connection port 132 and a USB connection port 133. The components of the interface 13 are not restricted. Alternatively, in some other embodiments, the interface 13 comprises at least one connection port selected from the audio input connection port 131, the power source connection port 132 and the USB connection port 133. Alternatively, the interface 13 is a widely-used human machine interface (e.g. a LED lamp for signal indication).

The speaker unit 11 is installed on the first case 121 for generating a sound wave. In this embodiment, the enclosure 12 of the speaker 10 is the combination of the first case 121 and the second case 122. After the interface 13 is installed on the second case 122 and before the second case 12 is combined with the first case 121, the second case 122 and the interface 13 are collaboratively referred as a semi-finished product A of the speaker. That is, the semi-finished product A of the speaker comprises the second case 122 and the interface 13, wherein the interface 13 is installed on the surface 124 of the second case 122.

When the interface 13 is embedded in the opening 123 of the second case 122, a leak whether existed between the interface 13 and the opening 123 of the second case 122 may be caused a leakage problem in the enclosure 12 of the speaker 10. For detecting whether there is a leak between the interface 13 and the opening 123 of the second case 122, the present invention provides a leak test system and a leak test method for testing the semi-finished product A of the speaker.

Figure 3:
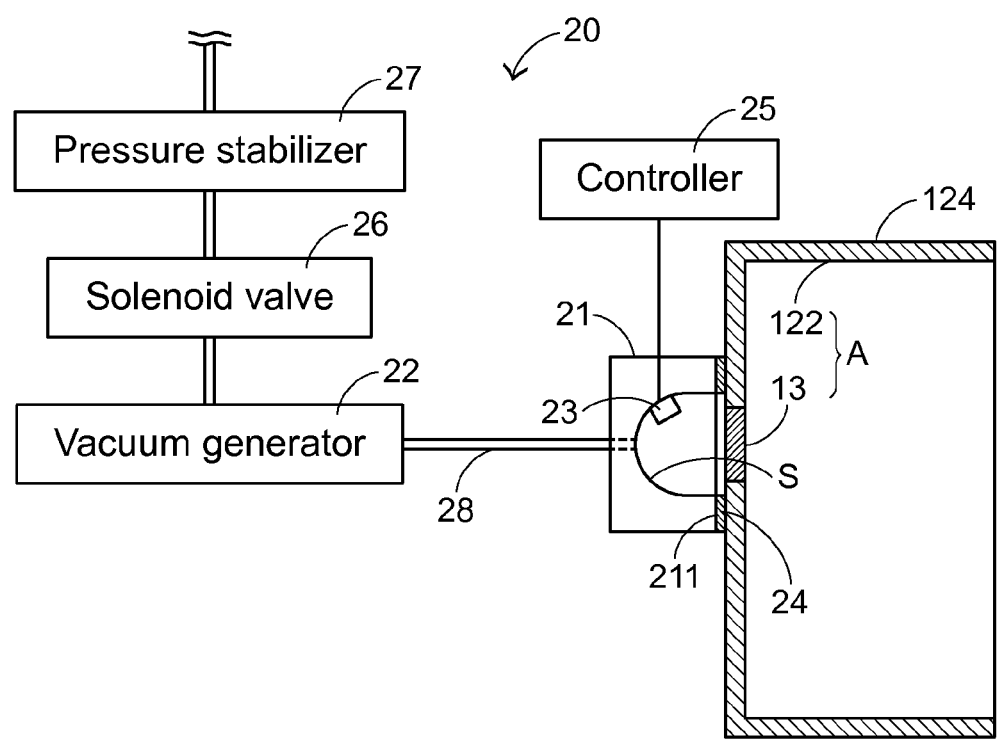
FIG. 3 schematically illustrates the architecture of a leak test system for testing a semi-finished product of a speaker according to a first embodiment of the present invention.

FIG. 3 schematically illustrates the architecture of a leak test system for testing a semi-finished product of a speaker according to a first embodiment of the present invention.

The leak test system 20 of FIG. 3 is used to detect whether the semi-finished product A of the speaker has a leak. As shown in FIG. 3, the leak test system 20 comprises a covering element 21, a vacuum generator 22, a pressure gauge 23, a rubber ring 24, a controller 25, a solenoid valve 26, a pressure stabilizer 27, and a communication tube 28. The covering element 21 comprises an inner surface S and an entrance edge 211.

An entrance is located at an end of the covering element 21. Consequently, a concave part is formed in the end of the covering element 21. The surface of the covering element 21 with the entrance is attached on the surface 124 of the second case 122 of the semi-finished product A of the speaker (especially the outer surface of the second case 122). Consequently, the interface 13 of the semi-finished product A of the speaker is completely covered by the concave part of the covering element 21. In this embodiment, the area of the entrance of the covering element 21 is larger than the area of the interface 13, and the profile of the entrance of the covering element 21 matches the shape of the interface 13.

For example, in case that the interface 13 is rectangular, the entrance of the covering element 21 is also rectangular. Moreover, the length of the long side of the entrance of the covering element 21 is larger than the length of the long side of the interface 13, and the length of the short side of the entrance of the covering element 21 is larger than the length of the short side of the interface 13. Alternatively, in another embodiment, the interface 13 is rectangular, and the entrance of the covering element 21 is circular. Moreover, the diameter of the entrance of the covering element 21 is larger than the length of the long side of the interface 13 and the length of the short side of the interface 13. An example of the covering element 21 includes but is not limited to a sucker.

Moreover, the rubber ring 24 is disposed on the entrance edge 211, which is arranged around the entrance of the covering element 21. When the covering element 21 is attached on the surface 124 of the second case 122, the covering element 21 can be firmly fixed on the surface 124 of the second case 122 via the rubber ring 24. An example of the rubber ring 24 includes but is not limited to a silicone rubber ring.

By using the flow of the compressed air, the vacuum generator 22 creates a vacuum. Since the air between the covering element 21 and the surface 124 of the second case 122 is extracted out by the vacuum generator 22, a negative pressure in the inner space of the covering element 21 is generated by the vacuum generator 22. In an embodiment, after the vacuum generator 22 extracts the air of a qualified semi-finished product of the speaker for a predetermined time period (e.g. 5 seconds), the value of negative pressure within the covering element 21 is defined as a default negative pressure value. It is noted that the leak test system is not restricted to generate the negative pressure. Alternatively, in another embodiment of the leak test system, a positive pressure generation device may be used to generate a positive pressure in inner space of the covering element. According to the positive pressure value, the leak test system may test the whether there is a leak.

The communication tube 28 is in communication with the covering element 21 and the vacuum generator 22. A first end of the communication tube 28 is connected with the vacuum generator 22. A second end of the communication tube 28 is in communication with the inner surface S of the covering element 21. In this embodiment, the pressure gauge 23 is installed on the inner surface S of the covering element 21. The pressure gauge 23 is used for measuring the value of an equilibrium pressure in the covering element 21. It is noted that the location of the pressure gauge is not restricted.

In this embodiment, the controller 25 is electrically connected with the pressure gauge 23. The equilibrium pressure value that is measured by the pressure gauge 23 is transmitted to the controller 25. It is noted that the controller 25 is not restricted to be electrically connected with the pressure gauge 23. For example, in another embodiment, the pressure gauge 23 is a wireless pressure gauge, and the wireless pressure gauge is in communication with the controller 25 in a wireless transmission manner.

If the equilibrium pressure value of the covering element 21 is equal to the default negative pressure value, which is the negative pressure generated by the vacuum generator 22 and corresponding to the qualified semi-finished product of the speaker, the controller 25 judges that the semi-finished product A of the speaker has no leak. On the other hand, if the absolute value of the equilibrium pressure value of the covering element 21 is lower than the absolute value of the default negative pressure value, which is the negative pressure generated by the vacuum generator 22 and corresponding to the qualified semi-finished product of the speaker, the controller 25 judges that the semi-finished speaker A has a leak between the second case 122 and the interface 13. Since the air may be introduced into the covering element 21 through the leak between the second case 122 and the interface 13, the controller 25 judges that the semi-finished product A of the speaker has a leakage problem.

Moreover, the leak test system 20 is further equipped with the solenoid valve 26 and the pressure stabilizer 27. During the process of testing the semi-finished product A of the speaker, the solenoid valve 26 and the pressure stabilizer 27 can control whether the air flows in the communication tube 28 or not, and can control the airflow in the communication tube 28 in order to stabilize the air pressure of the communication tube 28. The solenoid valve 26 and the pressure stabilizer 27 are located at an end of the vacuum generator 22, but are not limited thereto. The solenoid valve 26 is used to control whether the air in the communication tube 28 flows. After the vacuum generator 22 extracts the air from the covering element 21 for the predetermined time period, the solenoid valve 26 is turned off. Consequently, the vacuum generator 22 no longer extracts the air from the covering element 21. The pressure stabilizer 27 is used for stabilizing the air pressure of the communication tube 28. Since the fluctuation amount of the air pressure in the communication tube 28 is not too large, the read value of the pressure gauge 23 can be easily read. Moreover, for accelerating the testing task, the leak test system is preferably automated. Under this circumstance, the solenoid valve 26 and the pressure stabilizer 27 are electrically connected with the controller 25 and controlled by the controller 25, but are not limited thereto.

Figure 4:
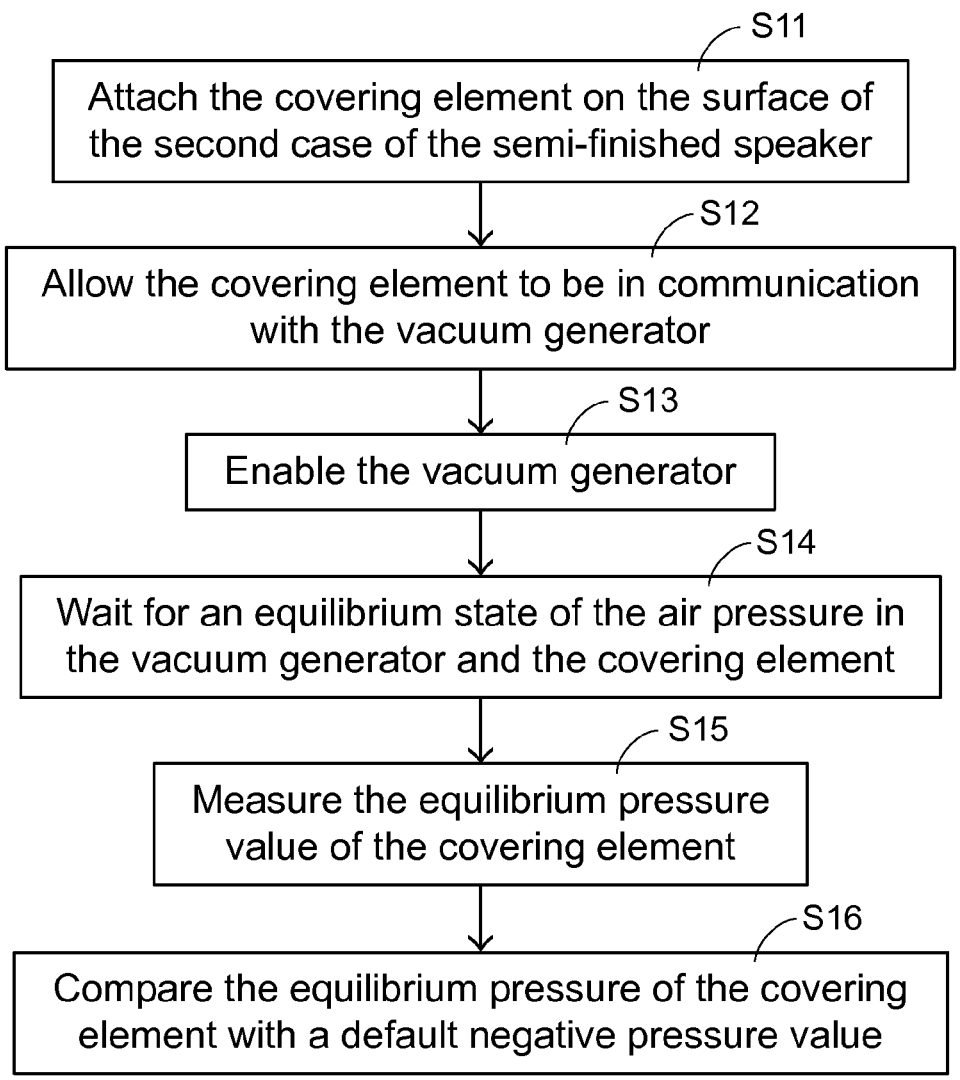
FIG. 4 schematically illustrates the flowchart of a leak test method for testing a semi-finished product of a speaker according to an embodiment of the present invention.

Hereinafter, a leak test method for testing a semi-finished product of a speaker according to an embodiment of the present invention will be illustrated with reference to FIG. 4. FIG. 4 schematically illustrates the flowchart of a leak test method for testing a semi-finished product of a speaker according to an embodiment of the present invention. As shown in FIG. 4, the leak test method comprises the steps S11~S16.

Firstly, in the step S11, the covering element 21 is attached on the surface 124 of the second case 122 of the semi-finished product A of the speaker. Consequently, the interface 13 of the semi-finished product A of the speaker is covered by the covering element 21.

In the step S12, the covering element 21 is in communication with the vacuum generator 22. As mentioned above, the communication tube 28 can be in communication with the covering element 21 and the vacuum generator 22.

Then, in the step S13, the vacuum generator 22 is enabled to extract air from the covering element 21, so that a negative pressure value of the inner space of the covering element 21 is generated.

Then, the step S14 is performed to wait for an equilibrium state of the air pressure in the vacuum generator 22 and the covering element 21.

When the air pressure reaches the equilibrium state, the equilibrium pressure value of the covering element 21 is measured by the pressure gauge 23 (Step S15).

Then, the step S16 is performed to judge whether the semi-finished product A of the speaker has the leak according to a result of comparing the equilibrium pressure value of the covering element 21 with a default negative pressure value, wherein the default negative pressure value is a negative pressure generated by the vacuum generator 22 when a qualified semi-finished product of the speaker is tested. If the equilibrium pressure value of the covering element 21 is equal to the default negative pressure value, the controller 25 judges that the semi-finished product A of the speaker has no leak. On the other hand, if the absolute value of the equilibrium pressure value of the covering element 21 is lower than the absolute value of the default negative pressure value, the controller 25 judges that the semi-finished product A of the speaker has a leak.

In this embodiment, the step of comparing the equilibrium pressure value with the default negative pressure value is performed by the controller 25, which is electrically connected with the pressure gauge 23. It is noted that the step of comparing the equilibrium pressure value with the default negative pressure value is not restricted to be performed by the controller. For example, in some other embodiments, the step of comparing the equilibrium pressure value with the default negative pressure value (i.e. the negative pressure generated by the vacuum generator and corresponding to the qualified semi-finished product of the speaker) may be performed by an inspector.

In the above embodiment, the process of judging whether the semi-finished product A of the speaker has a leak between the second case 122 and the interface 13 has been described. It is noted that the above leak test method may be used to judge whether the other semi-finished product of the speaker has a leak. That is, the above leak test method may be used to judge whether there is a leak after the speaker unit 11 is installed on the first case 121. If there is any leak after the speaker unit 11 is installed on the first case 121, the enclosure 12 of the speaker may have a leakage problem. In accordance with the present invention, after the covering element 21 is attached on the surface of the first case 121 to cover the speaker unit 11, the above leak test system and method may be employed to perform the leak test. Consequently, before the speaker 10 is assembled, the inspector may realize whether the semi-finished product of the speaker 10 is qualified or not. After the semi-finished products are assembled as the completed speaker 10, the inspector only needs to judge whether there is a leak at the junction between the semi-finished products.

Figure 5:
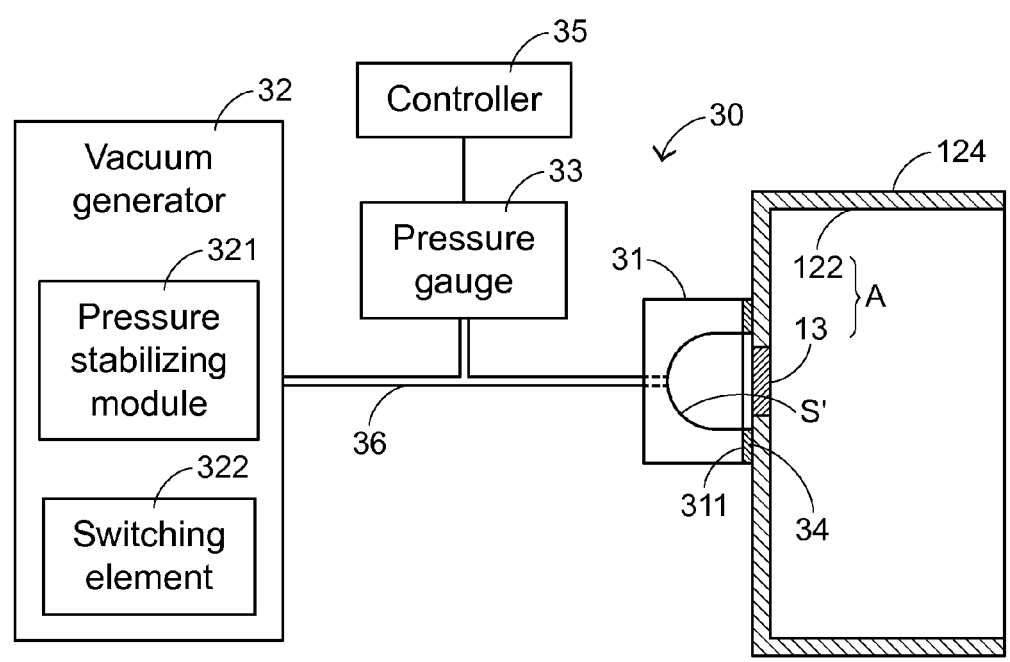
FIG. 5 schematically illustrates the architecture of a leak test system for testing a semi-finished product of a speaker according to a second embodiment of the present invention.

Hereinafter, a leak test system for testing a semi-finished product of a speaker according to a second embodiment of the present invention will be illustrated with reference to FIG. 5. FIG. 5 schematically illustrates the architecture of a leak test system for testing a semi-finished product of a speaker according to a second embodiment of the present invention. The leak test system 30 of FIG. 5 is used to detect whether the semi-finished product A of the speaker has a leak.

The semi-finished product A of the speaker comprises the second case 122 and the interface 13. The interface 13 is installed on the surface 124 of the second case 122. As shown in FIG. 5, the leak test system 30 comprises a covering element 31, a vacuum generator 32, a pressure gauge 33, a rubber ring 34, a controller 35, and a communication tube 36. The covering element 31 comprises an inner surface S' and an entrance edge 311. In comparison with the leak test system 20 of FIG. 3, the location of the pressure gauge 33 of the leak test system 30 of FIG. 5 is distinguished and the vacuum generator 32 comprises a pressure stabilizing module 321 and a switching element 322. The other components of the leak test system 30 of FIG. 5 are similar to those of the leak test system 20 of FIG. 3, and are not redundantly described herein.

Please refer to FIG. 5 again. The communication tube 36 is in communication with the covering element 31 and the vacuum generator 32, and the pressure gauge 33 is in communication with the communication tube 36. The pressure gauge 33 is used for measuring the value of an equilibrium pressure in the communication tube 36. The pressure stabilizing module 321 of the vacuum generator 32 is used for replacing the pressure stabilizer 27 of the leak test system 20 of FIG. 3. The air pressure of the communication tube 36 is stabilized by the pressure stabilizing module 321. The switching element 322 of the vacuum generator 32 is used for replacing the solenoid valve 26 of the leak test system 20 of FIG. 3. The switching element 322 is used to control whether the air flows in the communication tube 36. In other words, the airflow in the communication tube 36 of the leak test system 30 can be stabilized or controlled without the additional uses of the pressure stabilizer 27 and the solenoid valve 26. The operations of the leak test system 30 are similar to those of the leak test system 20 of FIG. 3, and are not redundantly described herein.

From the above descriptions, the present invention provides the leak test system and the leak test method for testing the semi-finished product of the speaker. By the vacuum generator, the space between the covering element and the semi-finished product of the speaker has a negative pressure value. By the pressure gauge, the equilibrium pressure value of the covering element is measured. According to a result of comparing the equilibrium pressure value of the covering element with the default negative pressure value, the leak test system judges whether the semi-finished product of the speaker has a leak. Consequently, the semi-finished product of the speaker with a leak can be detected before the semi-finished speaker is assembled as the completed speaker. That is, after the speaker is assembled, it is not necessary to disassemble the speaker to perform the leak test. Consequently, the efficiency of testing the speaker is enhanced. Moreover, if the assembled speaker has the leakage problem, the possibility of generating the leak at the semi-finished product of the speaker may be quickly excluded by the inspector. Under this circumstance, the inspector may search the leak from other possible locations of the assembled speaker (e.g. at the junction between the first case and the second case of the enclosure). Consequently, the efficiency of finding out the leak is increased.

While the invention has been described in terms of what is presently considered to be the most practical and preferred embodiments, it is to be understood that the invention needs not be limited to the disclosed embodiments. On the contrary, it is intended to cover various modifications and similar arrangements included within the spirit and scope of the appended claims which are to be accorded with the broadest interpretation so as to encompass all such modifications and similar structures.

What is claimed is:

1. A leak test system for testing a semi-finished product of a speaker by detecting whether the semi-finished product of the speaker has a leak, the semi-finished product of the speaker comprising a case, an interface being installed on a surface of the case, the leak test system comprising:
    a covering element attached on the surface of the case of the semi-finished product of the speaker, so that the interface of the semi-finished product of the speaker is covered by the covering element;
    a vacuum generator in communication with the covering element, wherein a negative pressure value of the covering element is generated by the vacuum generator;
    a pressure gauge, wherein an equilibrium pressure value of the covering element is measured by the pressure gauge; and
    a controller, wherein the controller is electrically connected with the pressure gauge, and the equilibrium pressure value measured by the pressure gauge is transmitted to the controller, wherein if the equilibrium pressure value is equal to the default negative pressure value, the controller judges that the semi-finished product of the speaker has no leak, wherein if an absolute value of the equilibrium pressure value is lower than an absolute value of the default negative pressure value, the controller judges that the semi-finished product of the speaker has the leak,
    wherein according to a result of comparing the equilibrium pressure value of the covering element with a default negative pressure value, the leak test system judges whether the semi-finished product of the speaker has the leak, wherein the default negative pressure value is the negative pressure value generated by the vacuum generator when a qualified semi-finished product of the speaker is tested.

2. The leak test system according to claim 1, wherein the covering element is a sucker.

3. The leak test system according to claim 1, wherein a rubber ring is disposed on an entrance edge of the covering element, wherein the covering element is firmly fixed on the surface of the semi-finished product of the speaker via the rubber ring, wherein the rubber ring is a silicone rubber ring.

4. The leak test system according to claim 1, wherein the interface comprises an audio input connection port, a power source connection port or a USB connection port.

5. The leak test system according to claim 1, wherein the pressure gauge is installed on an inner surface of the covering element.

6. The leak test system according to claim 1, further comprising a communication tube, wherein the communication tube is in communication with the covering element and the vacuum generator, and the pressure gauge is in communication with the communication tube.

7. The leak test system according to claim 6, further comprising a solenoid valve, wherein the solenoid valve is installed on the communication tube and controls whether an air flows in the communication tube, wherein when the solenoid valve is turned on, the covering element is in communication with the vacuum generator, wherein when the solenoid valve is turned off, the covering element is not in communication with the vacuum generator.

8. The leak test system according to claim 6, further comprising a pressure stabilizer, wherein the pressure stabilizer is installed on the communication tube, and an air pressure of the communication tube is stabilized by the pressure stabilizer.

9. The leak test system according to claim 1, wherein the vacuum generator comprises a pressure stabilizing module and a switching element, wherein an air pressure is stabilized by the pressure stabilizing module, and the switching element controls whether an air flows.

* * * * *